Jan. 9, 1940.       J. P. BEATTIE       2,186,797
DRIVE MECHANISM
Filed Oct. 23, 1937       3 Sheets-Sheet 3

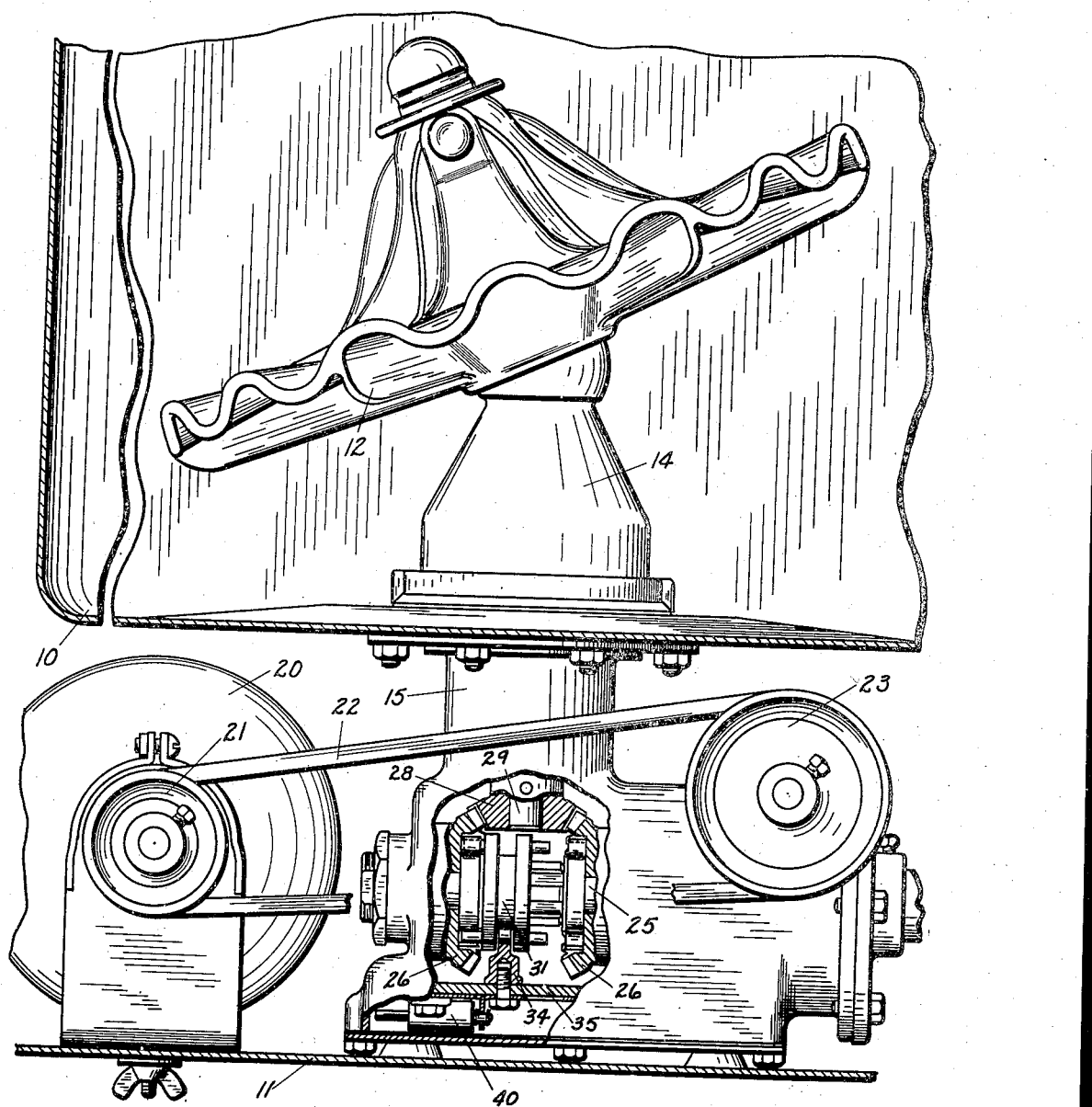
FIG_1.

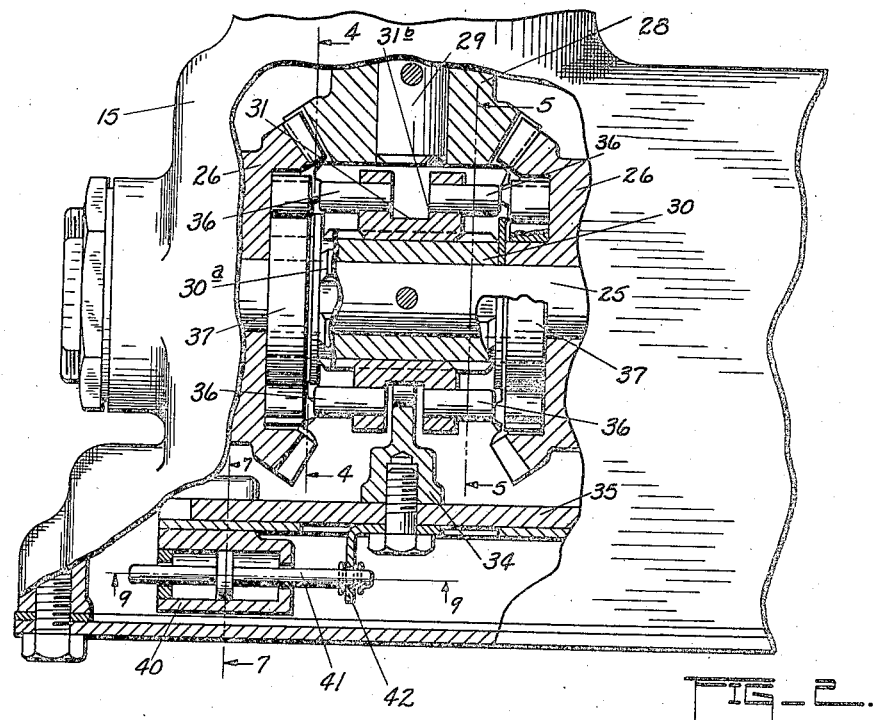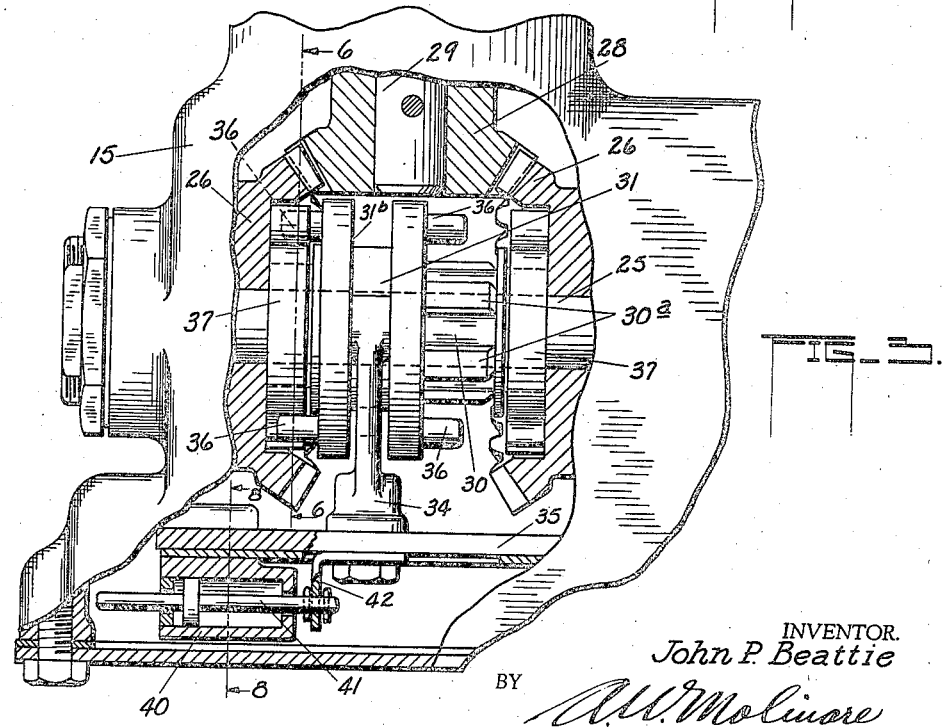

INVENTOR.
John P. Beattie
BY
A. W. Molinare
ATTORNEY.

Patented Jan. 9, 1940

2,186,797

UNITED STATES PATENT OFFICE 2,186,797

DRIVE MECHANISM

John P. Beattie, Oak Park, Ill., assignor to Electric Household Utilities Corporation, Chicago, Ill., a corporation of Illinois Application October 23, 1937, Serial No. 170,599

13 Claims. (Cl. 192—55)

This invention relates to driving mechanisms, and more particularly, to mechanisms of the type wherein rotary motion may be transmitted, by means of a clutch, from a driving member to a driven member.

In various types of apparatus employing motion transmitting mechanism of the character above indicated, and more particularly, in mechanism wherein the motion is to be transmitted positively by a clutch, such as of the jaw type, it has been found that severe stresses and strains are frequently set up between and in the driving and driven member and associated elements, when the clutch is suddenly engaged. Furthermore, in certain types of devices, such as those that are used in the home, office or factory, it is highly desirable that the driving mechanism thereof operate with the least appreciable amount of noise. Therefore, in certain apparatus, such as, for example, washing machines of certain types, it has been considered somewhat objectionable to employ driving mechanism of the character including a positive driving clutch, such as of the jaw type, due to the fact that, when operated, it produces objectionable noises. In most constructions of this type the noise and stresses and strain may result from either one or two different conditions, namely the impact due to axial engagement of the clutching elements, or the impact due to rotary engagement of the clutching elements.

It is one of the primary objects of this invention to provide a novel and improved motion transmitting mechanism of the character indicated, which is efficient, capable of economical manufacture, and which obviates the foregoing difficulties.

Another object is to provide in a motion transmitting mechanism of the type wherein rotary motion is transmitted from a driving member to a driven member by positive means, such as a jaw clutch, an improved and novel construction by virtue of which the torque load is gradually imparted to and assumed by the driven member so as to reduce stresses and strains and eliminate substantially all appreciable noise incident to the acquision of the load by the driven member.

A further object of this invention resides in the provision of an improved form of motion transmitting mechanism of the character above indicated, which is characterized by the provision of means for resiliently opposing axial movement of the driving member into operative engagement with the driven member, for reducing noise incident to such clutching engagement.

Other objects and advantages of this invention will be apparent from the following description, taken in connection with the accompanying drawings, in which:

Fig. 1 is an enlarged vertical sectional view through a washing machine, provided with driving mechanism embodying the present invention.

Fig. 2 is an enlarged elevational view, part in section, through the drive mechanism constituting the present invention, with the driving member shown in inoperative position.

Fig. 3 is a view similar to Fig. 2, showing the driving member in operative engagement with the driven member.

Figure 7:
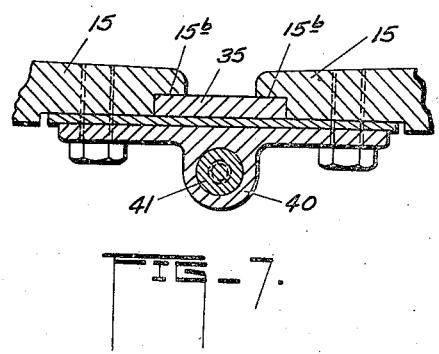
Figure 8:
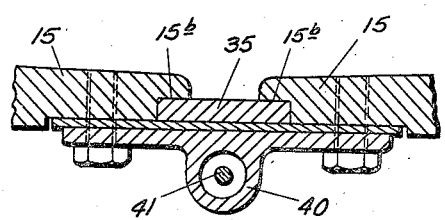

Figs. 7 and 8 are transverse sectional views through the dash-pot, taken as indicated at lines 7—7 and 8—8 on Figs. 2 and 3, respectively.

Figure 9:
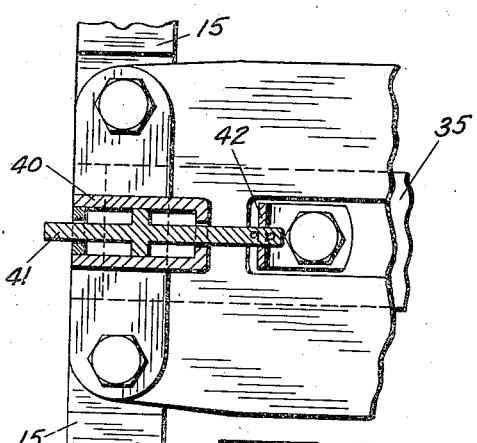

Fig. 9 is a sectional view through the dash-pot, taken at line 9—9 on Fig. 2.

In its broadest aspect, it is to be understood that the present invention is capable of application to a wide variety of driving mechanisms, and the disclosure of the invention in connection with a driving mechanism of a washing machine is merely by way of illustration, and the invention in no sense is to be understood as limited in its application to the form herein disclosed.

Referring now in detail to the drawings, the reference character 10 designates a conventional form of tub of a washing machine, having associated therewith a supporting frame 11, which, together with the tub, may be understood to be rigidly connected to supporting legs (not shown) for supporting the tub in proper spaced apart relation to the floor. Disposed within the tub is an impeller member, designated at 12, mounted on a frusto-conical support 14, seated on the bottom of the tub. In the construction herein disclosed, the impeller is adapted to be bodily driven in an orbit about a vertical axis, by a drive mechanism contained within a housing 15. Mounted on the frame 11 is a prime mover, herein shown in the form of an electric motor 20, provided with a driving pulley 21, which through the medium of a V-belt 22 drives a pulley 23 operatively connected to suitable reversible driving mechanism, enclosed within said housing 15, and by virtue of which the impeller member 12 is first rotated bodily in one direction and then reversely rotated in the opposite direction. Since the mechanism for imparting motion from the driving mechanism to the impeller member constitutes no part of the present invention, it is believed that a detailed description and illustration thereof, is unnecessary.

The driving mechanism embodying the present invention, and as illustrated in the drawings, is enclosed in housing 15 and includes a driving shaft 25 on which is journaled a pair of axially spaced apart bevelled gears 26, disposed in opposite relation, in constant mesh with a bevelled gear 28, rigidly secured to a transversely extending driven shaft 29. Interposed between the pair of bevelled gears 26 and rigidly secured on said shaft 25 is a splined sleeve 30 on which is mounted a clutching element comprising a driving member 31, axially movable along the splined sleeve 30 for selectively imparting motion from said shaft 25 to either of the bevelled gears 26, which in turn transmits rotary motion through the bevelled gear 28 to shaft 29. Said clutch member 31 and sleeve 30, intermediate the gears 26, are formed with cooperating splines 31$^a$ and 30$^a$, respectively.

Figure 4:
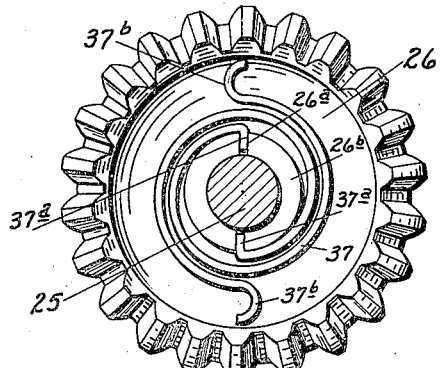
Fig. 4 is a transverse sectional view, taken at line 4—4 on Fig. 2.
Figure 5:
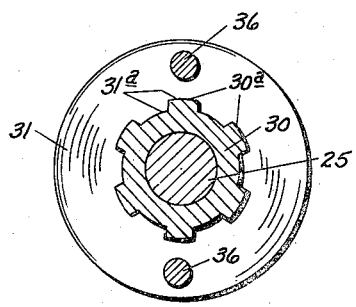
Fig. 5 is a transverse sectional view taken at line 5—5 on Fig. 2.
Figure 6:
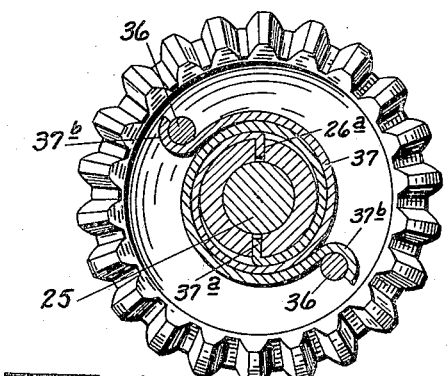
Fig. 6 is a transverse sectional view, taken at line 6—6 on Fig. 3.

The clutch member 31 is formed with an annular groove 31$^b$ into which extends an upstanding yoke or fork 34, rigidly secured at its lower end to a horizontally shiftable bar 35, slidably guided in a cooperatively formed groove 15$^b$ in the housing 15. Opposite ends of the clutch member 31 are formed with a plurality of driving elements 36, extending in axial direction and preferably equally spaced apart circumferentially about the axis of the shaft 25. Mounted on the adjacent ends of the respective bevelled gears 26 are cooperating clutch elements, each of which comprises a multiplicity of nested, spirally formed spring bands 37, having their inner ends 37$^a$ anchored in slots 26$^a$ formed in the hub 26$^b$ of the bevel gears 26, as may be seen in Figs. 4 and 6. The outer ends of the said spring members 37 are formed as hooks 37$^b$, providing seats for the respective driving elements 36 of the driving clutch element 31. It is to be understood that any suitable number of spring members 37 may be employed, and desirably, I employ a multiplicity of such springs to distribute the torque load among a greater number of elements.

As may be seen in Fig. 2, normally in inoperative position the clutch member 31 is disposed with its driving elements 36 out of engagement with said spring members 37 carried on the respective gears 26, and when the clutch member 31 is shifted axially on the splined sleeve 30, the driving elements 36 are moved into position for seating in the sockets 37$^b$ at the outer ends of the spring members. Due to the form of said spring members and their connection with the gears 26, the torque load is resiliently imparted to and assumed by the driven gear 26. It will be apparent that by virtue of such arrangement excessive strains and stresses, due to the sudden clutching engagement of clutches of the positive driving type, such as disclosed, is greatly reduced. Moreover, noise which is usually incident to the rotary impact between the cooperating elements of the driving and driven clutch members is substantially eliminated.

In clutching devices wherein rotary motion is transmitted through the medium of fixed or stationary jaws or elements, and wherein the shiftable clutch member is mounted so as to become arrested by axial impact with respect to the other clutch member, substantial noise usually results. For the purpose of obviating such noise, I provide a dash-pot 40 of conventional design, having its piston rod 41 operatively connected through a bracket 42 to the sliding bar 35. Usually the lower portion of the housing 15 is filled with suitable lubricating oil, which may enter the chamber of the dash-pot 40 so that when the shiftable bar 35 is actuated to cause the clutch device 31 to move into driving engagement with either of the bevelled gears 26, said dash-pot will serve to resiliently oppose such movement of the clutch element 31, and thereby substantially eliminate noise incident to the axial impact of said clutch element with either of the bevelled gears 26.

In washing machine construction of the type herein disclosed, wherein the impeller member 12 is rotated alternately in opposite directions, the driving mechanism may be actuated by the shiftable bar 35 which may be automatically reciprocated at pre-determined intervals. The means for so moving the bar 35 may be of any suitable form, such as that disclosed in Patent No. 1,850,396, issued March 22, 1932 to John T. Hume.

Although I have herein shown an embodiment of my invention, wherein the clutching elements are of dual character, it will be apparent that the invention is capable of wide application to various fields, employing a single clutching arrangement. It will be also understood that the invention is capable of substantial modification and re-arrangement of parts without departing from the spirit and scope thereof. I do not, therefore, wish to be understood as limiting this invention to the precise embodiment herein disclosed, except as it may be so limited by the appended claims.

I claim:

1. In a motion transmitting mechanism, the combination of a rotatable driven member, a rotatable driving member, and clutch means for positively transmitting rotary motion from the driving member to the driven member, said means comprising a spirally formed yieldable element anchored at one end to one of said members, the other end thereof being free, and a fixed element carried by the other member and movable into operative engagement with the free end of said yieldable element, whereby the torque load of the driving member is resiliently assumed by and imparted to said driven member.

2. In a motion transmitting mechanism, the combination of a rotatable driven member, a rotatable driving member, and clutch means for positively transmitting rotary motion from the driving member to the driven member, said means comprising a spirally formed yieldable element anchored at its inner end to one of said members, and a fixed element carried by the other member and movable into operative engagement with the outer end of said yieldable element, whereby the torque load of the driving member is resiliently assumed by and imparted to said driven member.

3. In a motion transmitting mechanism, the combination of a rotatable driven member, a rotatable driving member, and clutch means for positively transmitting rotary motion from the driving member to the driven member, said means comprising a spirally formed yieldable element anchored at one end to the driven member, the other end thereof being free, and a fixed element carried by the driving member, and movable into cooperative engagement with the free end of said yieldable element, whereby the torque load of the driving member is resiliently assumed by and imparted to said driven member.

4. In a motion transmitting mechanism, the combination of a rotatable driven member, a rotatable driving member, and clutch means for positively transmitting rotary motion from the driving member to the driven member, said means comprising a spirally formed yieldable element anchored at its inner end to the driven member, and a fixed element carried by the driving member and movable into operative engagement with the outer end of said yieldable element, whereby the torque load of the driving member is resiliently assumed by and imparted to said driven member.

5. In a motion transmitting mechanism, the combination of a rotatable driven member, a rotatable driving member, and clutch means for positively transmitting rotary motion from the driving member to the driven member, said means comprising a pair of nested spirally formed spring band elements having corresponding ends anchored to one of said members at circumferentially spaced apart points, and a pair of fixed elements carried by the other member, one of said members being movable toward the other for disposing said fixed elements and said other ends of said spring elements in cooperative driving relation, whereby the torque load of the driving member is resiliently assumed by and imparted to said driven member.

6. In a motion transmitting mechanism, the combination of a rotatable driven member, a rotatable driving member, and clutch means for positively transmitting rotary motion from the driving member to the driven member, said means comprising a pair of nested spirally formed spring band elements having corresponding ends anchored to one of said members at circumferentially spaced apart points, and a pair of fixed elements carried by the other member and movable into cooperative relation with the other ends of said spring elements, whereby the torque load of the driving member is resiliently assumed by and imparted to said driven member.

7. In a motion transmitting mechanism, the combination of a rotatable driven member, a rotatable driving member, and clutch means for positively transmitting rotary motion from the driving member to the driven member, said means comprising a pair of nested spirally formed spring band elements having their inner ends anchored to one of said members at circumferentially spaced apart points, and a pair of fixed elements carried by the other member and movable into cooperative relation with the outer ends of said spring elements, whereby the torque load of the driving member is resiliently assumed by and imparted to said driven member.

8. In a motion transmitting mechanism, the combination of a rotatable driven member, a rotatable driving member, and clutch means for positively transmitting rotary motion from the driving member to the driven member, said means comprising a pair of nested spirally formed spring band elements having corresponding ends anchored to the driving member at circumferentially spaced apart points, and a pair of fixed elements carried by the driving member and movable into cooperative relation with the other ends of said spring elements, whereby the torque load of the driving member is resiliently assumed by and imparted to said driven member.

9. In a motion transmitting mechanism, the combination of a rotatable driven member, a rotatable driving member, and clutch means for positively transmitting rotary motion from the driving member to the driven member, said means comprising a pair of nested spirally formed spring band elements having their inner ends anchored to the driving member at circumferentially spaced apart points, and a pair of fixed elements carried by the driving member and movable into cooperative relation with the outer ends of said spring elements, whereby the torque load of the driving member is resiliently assumed by and imparted to said driven member.

10. In a motion transmitting mechanism, the combination of a rotatable driven member, a rotatable driving member, and clutch means for positively transmitting rotary motion from the driving member to the driven member, said means comprising a multiplicity of nested spirally formed spring band elements having corresponding ends anchored to one of said members at substantially uniform circumferential spacings, and a pair of fixed elements carried by the other member and movable into cooperative relation with the other ends of said spring elements, whereby the torque load of the driving member is resiliently assumed by and imparted to said driven member.

11. In a motion transmitting mechanism, the combination of a rotatable driven member, a rotatable driving member, and clutch means for positively transmitting rotary motion from the driving member to the driven member, said means comprising a multiplicity of nested spirally formed spring band elements having their inner ends anchored to one of said members at substantially uniform circumferential spacings, and a pair of fixed elements carried by the other member and movable into cooperative relation with the outer ends of said spring elements, whereby the torque load of the driving member is resiliently assumed by and imparted to said driven member.

12. In a motion transmitting mechanism, the combination of a rotatable driven member, a rotatable, axially movable, driving member, clutch means rendered operable by the axial movement of said driving member for positively transmitting rotary motion from the driving member to the driven member, said means including a spirally formed yieldable element, anchored at its inner end to one of said members, and a fixed element carried by the other member and adapted for cooperatively engaging the outer end of said yieldable element, when the driving member is moved axially, whereby the torque load of the driving member is resiliently assumed by and imparted to said driven member, a dash-pot for resiliently opposing axial movement of said driving member, and means operatively connecting said driving member to the dash-pot.

13. In a motion transmitting mechanism, the combination of a rotatable driven member, a rotatable axially movable, driving member, clutch means rendered operable by the axial movement of said driving member for positively transmitting rotary motion from the driving member to the driven member, said means including a spirally formed yieldable element, anchored at its inner end to the driven member, and a fixed element carried by the driving member and movable by said driving member into cooperative engagement with the outer end of said yieldable element, whereby the torque load of the driving member is resiliently assumed by and imparted to said driven member, a dash-pot for resiliently opposing axial movement of said driving member, and means operatively connecting said driving member to the dash-pot.

JOHN P. BEATTIE.